United States Patent

[11] 3,584,717

| [72] | Inventors | Donald F. Suppes<br>Wyckoff;<br>Edwin J. Montalvo, Hackensack, both of, N.J. |
|---|---|---|
| [21] | Appl. No. | 846,392 |
| [22] | Filed | July 31, 1969 |
| [45] | Patented | June 15, 1971 |
| [73] | Assignee | Montalvo and Company, Inc.<br>Hackensack, N.J. |

| [54] | MOUNTING FOR BRAKE OR CLUTCH<br>8 Claims, 2 Drawing Figs. | |
|---|---|---|
| [52] | U.S. Cl. | 192/70,<br>188/71.3, 188/73.6, 192/70.13, 192/88 (A) |
| [51] | Int. Cl. | F16d 13/40,<br>F16d 55/24 |
| [50] | Field of Search | 192/70,<br>70.13, 88 A; 188/71.3, 73.6 |

[56] References Cited
UNITED STATES PATENTS

| 2,756,844 | 7/1956 | Chamberlain et al. | 188/73.3 |
|---|---|---|---|
| 3,081,843 | 3/1963 | Dotto et al. | 188/73.6 |
| 3,311,205 | 3/1967 | Suppes et al. | 192/70 |

FOREIGN PATENTS

| 956,559 | 4/1964 | Great Britain | 188/73.6 |

Primary Examiner—Allan D. Herrmann
Attorney—Albert M. Parker

ABSTRACT: An improved mounting system for a frictional brake or clutch system facilitates access to working parts for inspection and maintenance. Opposed pairs of sector-shaped bodies carrying friction members operable to contact a relatively rotatable disc are commonly mounted on removable pivot pins. In one embodiment three pivot pins serve to secure three pairs of opposed sector-shaped bodies. The removal of a pivot pin permits the outward rotation of any of the sector-shaped bodies it secures by pivoting the body about another pin so that the working parts may be inspected or repaired without the dismantling of the whole mechanism.

INVENTORS.
DONALD F. SUPPES
EDWIN J. MONTALVO
BY
ATTORNEY

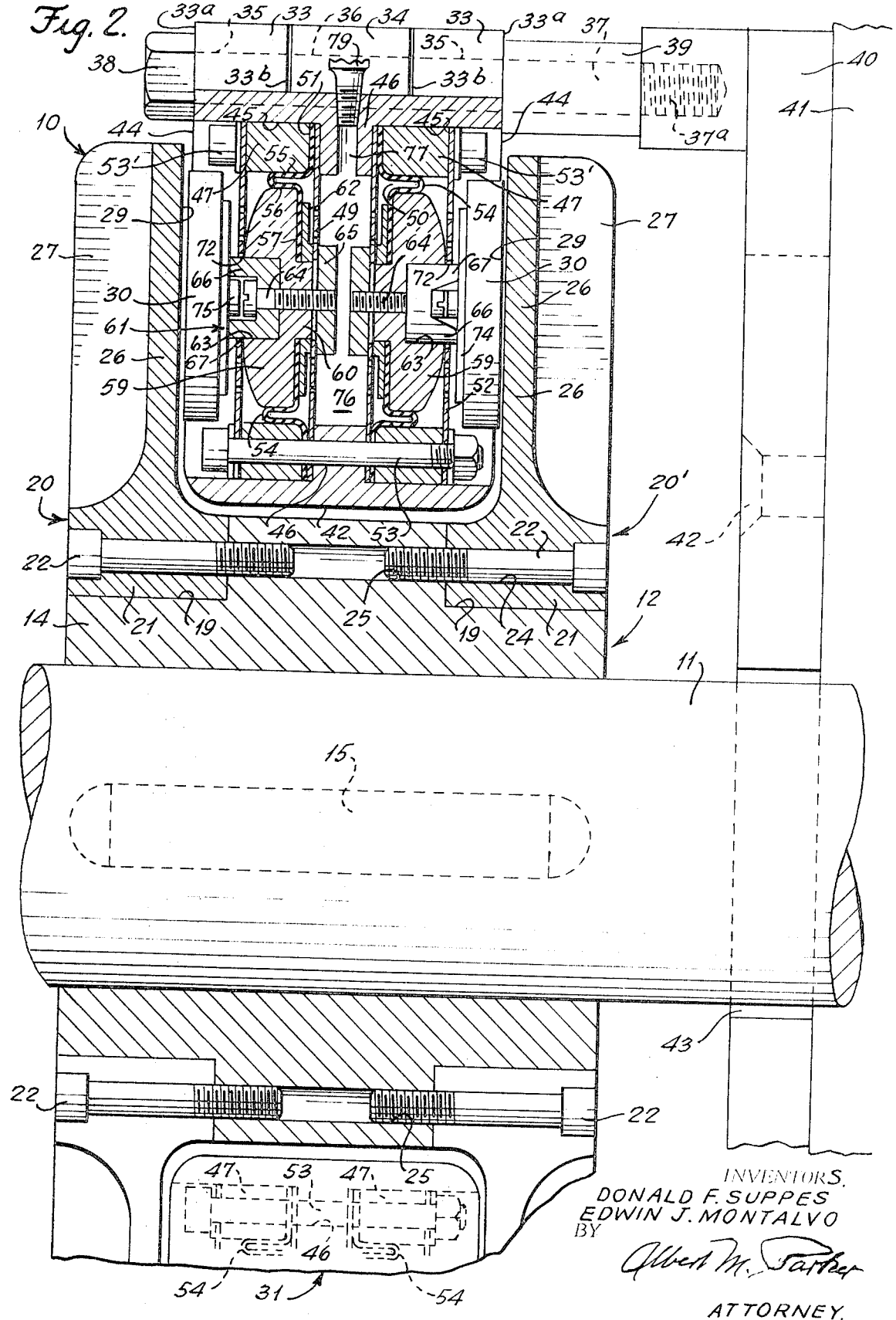

MOUNTING FOR BRAKE OR CLUTCH

The present invention represents an improvement upon the invention disclosed and claimed in the same inventors' U.S. Pat. Nos. 3,237,738 and 3,311,205, the disclosures of which are incorporated herein by reference in their entirety.

The friction pads of disc brakes and clutches become worn with use, and the moving parts which urge friction elements into engagement need occasional inspection and repair. In the past access to the friction pads and working parts has been a problem, usually requiring that the brake or clutch be substantially dismantled. This is even more difficult when the brake or clutch is a very massive device of the type used for controlling heavy machines such as large presses. The present invention solves this problem by pivotal mounting of the parts to which access for inspection and maintenance is most frequently necessary.

An object of the invention is to provide an improved friction brake or clutch mechanism.

Another object of the invention is to provide an improved system for mounting a frictional brake or clutch mechanism wherein pivotal mounting of parts permits easy access for repair and inspection.

These and other features of the invention will be better understood by referring to the accompanying drawings taken in conjunction with the following detailed description of an embodiment of the invention, in which:

FIG. 2 is an enlarged view in section through the mechanism of FIG. 1, the section being taken along the lines 2—2 of FIG. 1 and looking in the direction of the arrows.

Figure 1:
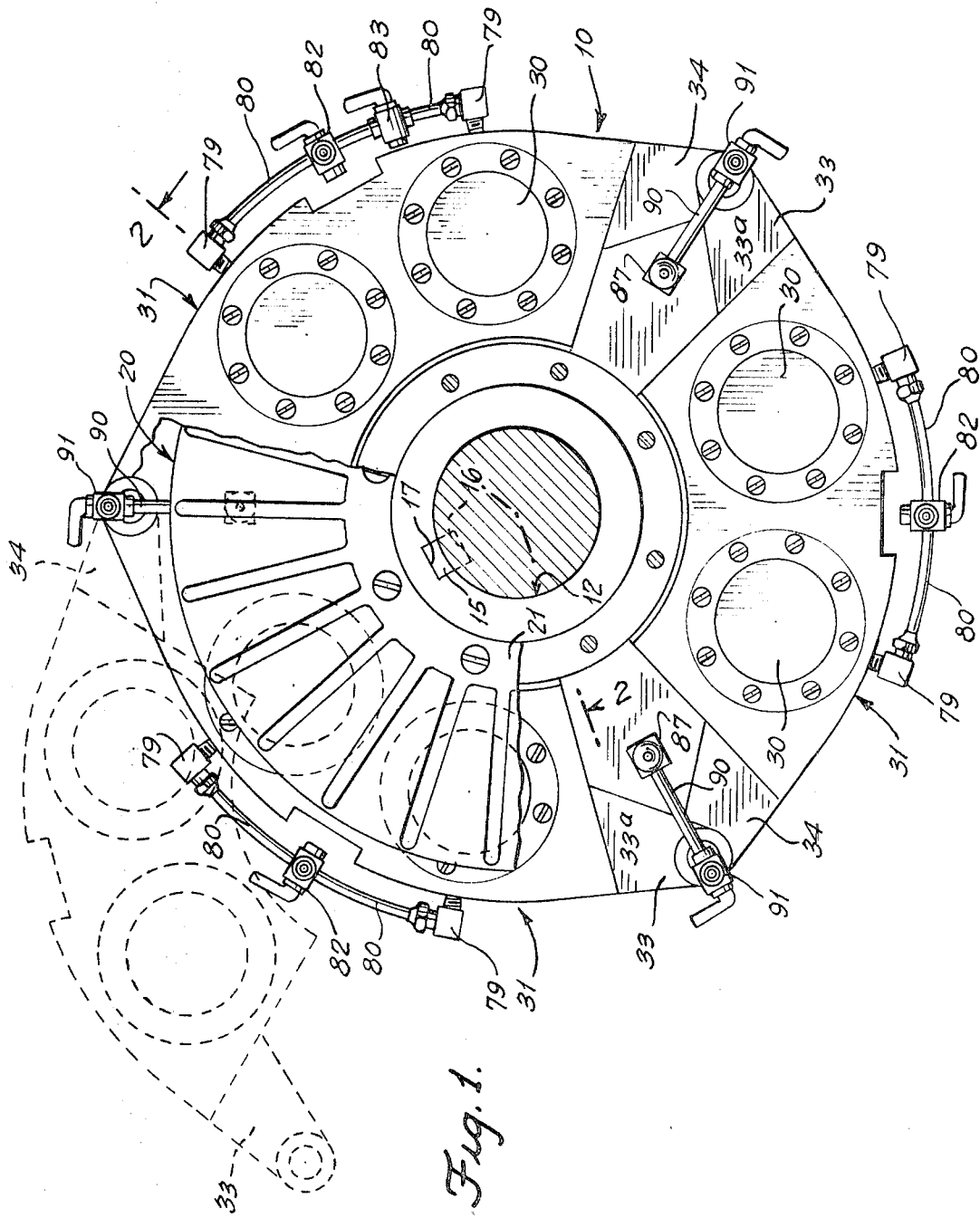
FIG. 1 is a front view in elevation of a friction coupling mechanism mounted according to the improved system of the invention, a shaft to which the mechanism is connected being shown in transverse section, a part of the friction plate nearer the reader in the figure being broken away.

A mechanism mounted according to the invention is illustrated herein in an embodiment adapted to function as a friction brake. Of course the mounting system could be used in connection with other types of friction coupling mechanisms, such as clutches. In the embodiment shown, the brake, generally designated by reference character 10, is adapted to selectively frictionally couple a rotatable shaft 11 to a nonrotatable annular mounting ring 40 so as to bring the shaft 11 to a stop and to restrain it against rotation. The mechanism includes a rotor 12 which is secured to shaft 11 in the manner shown in FIGS. 1 and 2.

The rotor 12 has an annular sleevelike hub 14 secured to shaft 11 by means of a key 15 disposed in a groove 16 in the shaft and in a keyway 17 in the hub 14 of the rotor. Hub 14 of the rotor 12 has an annular seat 19 on each side thereof, as best shown in FIG. 2. Each seat 19 accurately receives an inner, thickened edge 21 of a respective one of two opposed similar friction plates 20,20'. The friction plates 20,20' are securely held on the hub 14 and retained against rotation relative thereto by a plurality of studs 22 which extend inwardly through angularly spaced bores 24 in the inner edge 21 of each of the plates 20,20'. The studs 22 are screwed into respective threaded passages 25 in the hub 14.

Each plate 20,20' has an outer portion 26 which is somewhat thinner than the inner portion 21. The outer portions 26 have a plurality of radially directed cooling fins 27 formed integrally with the plate. The inner face 29 of each plate 20,20' is flat and annular and lies in a plane transverse to the axis of shaft 11. The friction coupling mechanism 10 in the illustrative embodiment includes a plurality (six shown) of opposed pairs of friction members 30 in the form of discs mounted on a body which is fixed from rotation with respect to the shaft 11. The friction members 30 are adapted to be selectively forcibly thrust outwardly into frictional contact with the respective flat faces 29 of the opposed plates 20 and 20'.

As shown in FIGS. 1 and 2, two pairs of opposed friction members 30 are mounted in each of three sector-shaped bodies 31 which are disposed coaxially of the shaft 11 and rotor 12 and are spaced at equal angles from each other. Extending from one circumferential end of each sector-shaped body 31 are a pair of spaced outer ears 33, each of which has its outer side 33a coplanar with one of the faces of the body 31. The inner sides 33b of the ears 33 are spaced from each other. The other circumferential end of each body 31 has one centrally disposed inner ear 34 which is somewhat thinner than the space between the inner sides 33b of the outer ears 33, so that each inner ear 34 can be received between a pair of overlapping outer ears 33 of the next adjacent sector-shaped body 31.

The outer and inner ears 33 and 34 are similar in plan, as shown in FIG. 1, having straight peripheral edges aligned tangentially to the generally circular periphery of their respective sector-shaped bodies 31 at the points where the ears join the bodies. The ears 33 and 34 are tapered to widen toward their respective bodies 31 and are preferably rounded at their ends as shown in FIG. 1. Ears 33 and 34 may be integrally formed with their bodies 31 or may be secured thereto by welding or other suitable means.

Aligned bolt holes 35 and 36 extend parallel to shaft 11 through the ears 33 and 34 respectively, near the rounded ends of the ears in the area where the ears 33 and 34 of adjacent bodies 31 are overlapped. Pivot pins 37 are journaled in the aligned bolt holes 35,36 of each set of overlapped ears 33,34. Thus three pivot pins 37 are used in mounting the assembly of three sector-shaped bodies 31, the pivot pins 37 being angularly spaced essentially 120° from each other. Each pivot pin 37 has an enlarged head 38 which lies adjacent the outer side 33a of an outer ear 33 as shown at the right side of the brake 10 in FIG. 2. The other end of the pivot pin 37 is threaded, as shown at 37a in FIG. 2, to be screwably received in an annular, internally threaded fitting 37a extending outwardly toward the brake 10 from the mounting ring 40. A bushing 39 surrounds a portion of the pivot pin 37 between the fitting 38 and the ear 33 nearer the mounting ring 40 to space the brake 10 from the mounting ring.

The mounting ring 40 is secured to a fixed structure 41 such as the frame of a machine in connection with which the brake 10 is used, by a plurality of bolts 42 as shown in FIG. 2, and a generally circular opening or passage 43 is provided centrally through the ring 40 to receive the rotatable shaft 11.

When access to the working parts housed in the sector shaped bodies 31 is necessary, any or all of the bodies may be swung out around either of its pivot pins 37, through the position shown in dashed lines in FIG. 2. Thus the removal of the friction plates 20,20' is not necessary for access to the friction members 30.

The mounting system of this invention is suitable for use in connection with many different clutch and brake assemblies. The drawings show the mounting system used in connection with a friction coupling mechanism as disclosed in our U.S. Pat. No. 3,237,738, in which each of the bodies 31 is preferably provided with two angularly spaced sets of opposed fluid operated reciprocating piston assemblies of the diaphragm type which thrust the friction members 30 against the faces 29 of the plates 20,20'. The structure of these assemblies is best shown in FIG. 2. Each body 31 has a bore 45 extending inwardly therein to a relatively thick central radially inwardly directed flange 46. An annular body 47 fits accurately within each bore 45, the body 47 functioning to thrust together the radially outer edge of an axially inner flat spring member 49 and the outer edge 51 of a resilient diaphragm 50 of rubber or the like, which lies axially outwardly of spring member 49. This motion brings the outer diaphragm edge 51 into contact with the annular side surface of flange 46. A radially outer edge of a second, outer flat spring member 52 which is similar to spring member 49, over lies the axially outer face of member 47. The two back to back reciprocating piston assemblies positioned in aligned bores 45 have their parts held together by a plurality of equally angularly spaced bolts 53 which, reading from left to right in FIG. 2, extend through passages in the outer edge of spring 52, through member 47, through flange 51 of the diaphragm 50, through the outer edge of spring 49, through flange 49 and then through the radially outer parts of the other opposed assembly in the reverse order to that just stated for the first assembly. The bolts 53 are secured at their threaded right-bond ends by nuts as shown. Other bolts or screws 53' serve to secure the outer edges of the springs 49 and 52.

The diaphragm 50 has a rounded annular fold 54 which is open in an axially inward direction. The outer sidewall 55 of the diaphragm adjacent fold 54 and the inner sidewall 56 thereof lie generally parallel to the radially spaced from each other. An annular plunger body 59 fitting with the inner sidewall 56 of the diaphragm is disposed in bore 45 coaxial thereof and is maintained in such position by the above mentioned flat spring members 49 and 52. Plunger body 59 is made of nonmagnetic material such as aluminum. Beyond the inner wall 56 the diaphragm 50 continues in a radially inwardly extending annular flange portion 57 which overlies and sealingly engages the radially outer annular axially inner surface of plunger body 59. The plunger body 59 has a central axially extending boss 60 which extends through a central hole in the flange 57 of the diaphragm 50.

The axially outer end of plunger body 59 is provided with a circular cylindrical seat 63 within which there is received a permanent magnet 61, which may be made, for example, of "Alnico." The magnet 61 has a shape which is most clearly shown at the upper right in FIG. 2. The inner end of the magnet is in the form of a thick-walled circular cylindrical sleeve. The forward end of magnet 61, which has spaced opposite poles 66 and 67 of opposed magnetic polarity, extends through and closely fits within a central hole 72 in the flat spring 52. The plunger assembly is completed by a stepped washer 62 which lies between the inner flat spring member 49 and the inner flange 57 of the diaphragm 50 with the broader portion thereof in contact with the flange of the diaphragm, a bolt or screw 64, made of nonmagnetic material such as brass, which extends through the axial passage in magnet 61 and has its head received within a central seat in the magnet between the opposed holes thereof, and a nut 65, the radially outer edge of which overlies the inner edge of the flat spring member 49.

The flat springs 49 and 52, which are made of nonmagnetic material such as a resilient beryllium-copper alloy, maintain the plunger body 59 in the retracted position shown in FIG. 2 when the chamber 76 between the inner ends of the opposed motors is subjected only to atmospheric pressure. When, however, chamber 76 is subjected to appreciable fluid pressure by being connected to a source of compressed air, the plunger body 59 is thrust axially outwardly so as strongly to force its friction element 30 against the confronting face 29 of its respective friction plate 20, 20'.

The flat spring members 49 and 52, which may be of identical construction, each have a central opening 72 therethrough. Each plate has a plurality of holes spaced radially outwardly from hole 72 and spaced angularly at 90° from each other. From each of such angularly spaced holes there extends a first chordally disposed slot and a second chordally disposed slot at right angles to the first slot, each second slot lying intermediate a first slot from an adjoining one of the angularly spaced holes and the central hole 72 through the flat spring member. As a result of such construction, the central part of the disc is, in effect, supported by four equally angularly spaced fingers which connect it to the outer peripheral portion of the spring member. Thus the central portion of the spring member may yield appreciably in an axial direction with respect to the outer peripheral portion thereof.

The friction element 30 has a disc member 74 with a central boss 75 affixed thereto, the disc and boss both being made of magnetic metal. The boss 75 has a diameter such that it is received within the seat provided between the poles 66 and 67 of the magnet and the head of the bolt 64, with at least a slight freedom of radial and angular movement with respect to the magnet. The magnet 61 thus retains the friction element securely in place while permitting it to adjust itself slightly as may be required as the friction element wears.

Fluid under pressure flows between the chamber 76 and the inner surface of each of the diaphragms 50 of the opposed fluid actuated piston assemblies in each pair thereof through the angularly spaced holes and the first and second slots in the flat spring members 49 of each of the motors. The chamber 76 between the inner ends of each pair of opposed actuated piston assemblies is supplied with fluid under pressure through a passage 77 extending radially through the flange 46. A nipple 79 is screwed into the outer end of passage 77. The nipples 79 of the two chambers 76 in each body 31 are connected by a cross-pipe 80 to which a branch supply pipe (not shown) is connected. As disclosed in our U.S. Pat. No. 3,237,738, each branch supply pipe is connected to a manifold or bustle pipe through a shutoff valve 82. The manifold, in turn, is supplied with fluid under pressure from a source, not shown, through a main supply pipe provided with a main control valve. When the valves 82 are suitably manipulated, two, four, or six of the opposed pairs of fluid actuated piston assemblies of the mechanism 10 may be operated when the main control valve is opened. In order to permit the operation of the mechanism 10 with any number from one to six of the opposed pairs of fluid actuated piston assemblies in operative condition, there is provided a shutoff valve 83 in the branch line 80 leading to one pair of fluid actuated piston assemblies, whereby such one opposed pair of fluid actuated piston assemblies may be selectively made to be operative or inoperative.

The pipes which supply fluid under pressure to the piston assemblies of each body 31 through valves 82 are preferably of flexible material or are mounted for easy disconnection from the main fluid supply lines, so that the sector-shaped bodies 31 may be pivoted outwardly as described above. In this respect the fluid supply arrangement differs somewhat from that of our aforementioned prior patents.

Preferably the mechanism 10 is provided with cooling means for plates 20 in addition to the above-mentioned cooling fins 27 thereon. Such cooling means takes the form of three double-ended nozzles 87, one of which is located in each of the spaces between the confronting radial end surfaces of the successive bodies 31.

Each end of the nozzle body is provided with a nozzle opening. The nozzle body is provided with fluid under pressure such as compressed air, such fluid being discharged through the nozzle openings against the inner faces 29 of the plated 20. A convenient and preferred manner of supplying nozzles 87 with fluid is illustrated in FIG. 1, wherein the pipe 90 which supplies each double-ended nozzle 87 is connected to the manifold through a manually operated shutoff valve 91. When the shutoff valves 91 are opened, the opening of the main control valve not only supplies fluid under pressure to the chamber 76 of each operative pair of opposed fluid actuated piston assemblies, but also causes cooling fluid to be discharged from the nozzles 87 against the friction plates 20,20', as described.

In FIG. 1 the pipes 90 and their shutoff valves 91 are shown to be positioned in front of the heads 38 of the pivot pins 37. Thus they are on the side of the brake 10 which is away from the mounting ring 40. The cooling means do not interfere with the pivotal movement of bodies 31, since they are not connected thereto. If desired, the cooling means may be provided with flexible pipes to allow easier access to the heads 38 of the pivot pins 37, or the pipes 90 may be constructed to be readily disconnected.

The brake 10 may be provided with guide means for the frictional members or pads as disclosed in our prior U.S. Pat. No. 3,311,205. Such means are not shown in the drawings for the sake of simplicity and clarity but the advantages and the manner of their use in a mechanism according to the present invention will be obvious to those skilled in the art.

Although only one embodiment of the invention has been illustrated in the accompanying drawings and described in detail it will be obvious that various changes and modifications can be made without departing from the spirit and scope of the invention. For example the mechanism shown is readily adaptable for use as a clutch for coupling two relatively rotatable elements. A different number of sector shaped bodies might be advantageously pivotally mounted according to the invention, or a different number of piston assemblies could be housed in each pivotable body.

We claim:

1. In a mechanism for frictionally coupling two relatively rotatable bodies, one of said bodies including a pair of cooperating friction members, the other of said bodies including two spaced, opposed, parallel plates for engagement with said friction members, said pair of friction members being operatively positioned between said plates, means for moving both friction members of said pair outwardly in mutually opposite directions and parallel to the axis of relative rotation of the bodies to engage the friction members with said plates, a fixed structure, a pivotal mounting means carried by said fixed structure and said one of said bodies for mounting said one body and said friction members carried thereby for swingable movement generally at right angles to the axis of relative rotation of the bodies, said swingable mounting means being formed to provide movement of said one body free and clear of the other of said bodies.

2. Mechanism as in Claim 1, said pivotal mounting means including hinge ears carried by said one of said bodies at opposite ends of the same.

3. Mechanism as in Claim 1, said one of said bodies including a plurality of arcuate elements, said pivotal mounting means mounting said arcuate elements together in end to end overlapping relationship to form a complete annulus.

4. Mechanism as in Claim 3, said end to end overlapping relationship including interleaved hinge ears carried by said ends of said elements.

5. Mechanism as in Claim 4, said pivotal mounting means including removable hinge pins extending through said hinge ears whereby on removal of one of said hinge pins said bodies carrying said interleaved ears may be swung out of the path of said annulus about their opposite ends to provide ready access to said friction members.

6. Mechanism as in claim 1, said opposed parallel plates being generally annular in form and presenting flat inner surfaces for engagement by said friction members.

7. A friction coupling member including a pair of friction elements mounted to move in mutually opposite directions for engagement with opposed surfaces of two parallel plates carried by a member with respect to which said friction coupling member is relatively rotatable, said coupling member comprising an arcuate body, normally positioned between said plates means extending transversely of said body for the mounting of said friction elements at opposite sides of said body and for movement toward and away from said body sides, and hinge means formed at an end of said body about a hinge axis parallel to said transverse extent of said mounting of said friction elements, whereby said member may be swung about said hinge at right angles to the movement of said friction elements.

8. A friction coupling member as in claim 7, said hinge means being formed at both ends of said body and including a pair of spaced ears at one end and a complimentary intermediate ear at the other end whereby a plurality of said coupling members may be assembled in hinged end to end relationship.